(12) United States Patent
Du et al.

(10) Patent No.: US 8,842,611 B2
(45) Date of Patent: Sep. 23, 2014

(54) COMPRESSED HYBRID AUTOMATIC REPEAT REQUEST FEEDBACK FOR DEVICE TO DEVICE CLUSTER COMMUNICATIONS

(75) Inventors: Jinling Du, Shanghai (CN); Ting Zhou, Shanghai (CN); Jing Xu, Shanghai (CN); Zhenhong Li, Shanghai (CN); Haifeng Wang, Shanghai (CN)

(73) Assignee: Nokia Corporation, Espoo (FI)

( * ) Notice: Subject to any disclaimer, the term of this patent is extended or adjusted under 35 U.S.C. 154(b) by 114 days.

(21) Appl. No.: 13/582,446

(22) PCT Filed: Mar. 3, 2010

(86) PCT No.: PCT/CN2010/070844
§ 371 (c)(1),
(2), (4) Date: Sep. 3, 2012

(87) PCT Pub. No.: WO2011/106931
PCT Pub. Date: Sep. 9, 2011

(65) Prior Publication Data
US 2012/0327760 A1    Dec. 27, 2012

(51) Int. Cl.
*H04Q 7/00* (2006.01)
*H04Q 7/24* (2006.01)
*H04L 1/18* (2006.01)
*H04L 1/00* (2006.01)

(52) U.S. Cl.
CPC ....... *H04L 1/1887* (2013.01); *H04L 2001/0093* (2013.01)
USPC .......................................... 370/328; 370/338

(58) Field of Classification Search
CPC ........ H04L 45/16; H04W 4/06; H04W 74/08; H04W 80/04; H04W 84/12; H04W 84/18; H04W 88/06; H04W 88/08
USPC .................................. 370/312, 328, 338, 432
See application file for complete search history.

(56) References Cited

U.S. PATENT DOCUMENTS 6,505,253 B1 *  1/2003  Chiu et al. .................... 709/235
7,171,476 B2 *  1/2007  Maeda et al. ................. 709/227
(Continued)

FOREIGN PATENT DOCUMENTS

| EP | 0303830 A2 | 2/1989 |
| JP | 2007-228064 A | 9/2007 |
| JP | 2007-266876 A | 10/2007 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.6.0, Mar. 2009, pp. 1-83.

(Continued)

*Primary Examiner* — Hong Cho
(74) *Attorney, Agent, or Firm* — Nokia Corporation

(57) ABSTRACT

A method can include receiving at a cluster head, a multicast/broadcast packet from a base station. The method can also include monitoring, at the cluster head, to detect whether any members of a cluster of the cluster head responds to the multicast/broadcast packet with a negative acknowledgment directed to the cluster head. The method can further include, when a result of the monitoring is no detection of any negative acknowledgments, and the cluster head successfully received the multicast/broadcast packet, sending, by the cluster head, a general acknowledgment of the multicast/broadcast packet to the base station.

8 Claims, 10 Drawing Sheets

(56) References Cited

U.S. PATENT DOCUMENTS

| | | | |
|---|---|---|---|
| 7,242,671 B2* | 7/2007 | Li et al. | 370/254 |
| 8,214,470 B2* | 7/2012 | Quilty | 709/221 |
| 8,218,475 B2* | 7/2012 | Lee et al. | 370/318 |
| 2004/0018839 A1* | 1/2004 | Andric et al. | 455/433 |
| 2005/0207345 A1* | 9/2005 | Onggosanusi et al. | 370/236 |
| 2008/0062911 A1* | 3/2008 | Choi et al. | 370/315 |
| 2008/0155148 A1 | 6/2008 | Oyman | |
| 2008/0282126 A1 | 11/2008 | Chindapol et al. | |
| 2009/0080356 A1* | 3/2009 | Song et al. | 370/312 |
| 2009/0086657 A1* | 4/2009 | Alpert et al. | 370/310 |
| 2009/0129321 A1* | 5/2009 | Jain | 370/328 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 8)", 3GPP TS 36.212, V8.6.0, Mar. 2009, pp. 1-59.

International Search Report and Written Opinion received for corresponding Patent Cooperation Treaty Application No. PCT/CN2010/070844, dated Dec. 9, 2010, 10 pages.

* cited by examiner

COMPRESSED HYBRID AUTOMATIC REPEAT REQUEST FEEDBACK FOR DEVICE TO DEVICE CLUSTER COMMUNICATIONS

RELATED APPLICATION

This application was originally filed as PCT Application No. PCT/CN2010/070844 filed Mar. 3, 2010.

BACKGROUND

1. Field

Device to device (D2D) communication can employ various acknowledgment schemes. In particular, D2D communications can assist the use of acknowledgment, by a cluster, of a multicast message sent to the cluster.

2. Description of the Related Art

Multicast services are becoming more and more popular with the development of cellular wireless networks (e.g. long term evolution (L 1E) networks), where data is transmitted to multiple recipients by an evolved Node B (eNodeB) or similar base station device. By utilizing the shared nature of wireless medium, multicast service can be realized with a high efficiency. In order to support reliable packet delivery in multicast service, hybrid automatic repeat request (HARQ) protocol can be incorporated into the packet multicasting process, i.e. each device in the recipient cluster will feedback an acknowledgement and negative acknowledgement (ACK/NACK) message for each of the multicast packets; and a packet will be retransmitted if a NACK message is reported by the service recipient. Typically, the HARQ acknowledgement is packet-wise, i.e., every packet recipient reports its own acknowledgment to the control node in universal terrestrial radio access network (UTRAN) and enhanced UTRAN (E-UTRAN), the control node retransmits the packet according to the received HARQ acknowledgement.

For multicasting service with a device-to-device (D2D) cluster, the HARQ acknowledgement for requesting the retransmission or new transmission from eNodeB is one of the signaling elements to be considered. Because a cluster of devices may need to feed back the HARQ acknowledgement, optimization of HARQ feedback signaling for a cluster of devices can help to control the efficiency of uplink control signaling and minimize its impact on system efficiency.

SUMMARY

In certain embodiments, the present invention is a method. The method can include receiving at a cluster head, a multicast/broadcast packet from a base station. The method can also include monitoring, at the cluster head, to detect whether any members of a cluster of the cluster head responds to the multicast/broadcast packet with a negative acknowledgment directed to the cluster head. The method can further include, when a result of the monitoring is no detection of any negative acknowledgments, and the cluster head successfully received the multicast/broadcast packet, sending, by the cluster head, a general acknowledgment of the multicast/broadcast packet to the base station.

In further embodiments, the present invention is also a method. The method can include sending, by a base station, a multicast/broadcast packet to a cluster including a cluster head and cluster member(s). The method can also include storing, in a storage buffer at the base station, the multicast/broadcast packet while awaiting an acknowledgment of the multicast/broadcast packet. The method can further include releasing, by the base station, the storage buffer upon receiving any acknowledgment of the multicast/broadcast packet except a general negative acknowledgment.

The present invention is, in additional embodiments, a method. The method can include receiving, at a cluster member, a multicast/broadcast packet from a base station. The method also can include monitoring, at the cluster member, to determine whether another cluster member responds to a cluster head with a negative acknowledgment. The method can further include monitoring, at the cluster member, to determine what kind of acknowledgment the cluster head uses to respond to the base station, wherein the kind is one kind selected from a general affirmative acknowledgment, a general negative acknowledgment, a specific affirmative acknowledgment, or a specific negative acknowledgment.

A computer-readable medium encoded with instructions that, when executed in hardware, perform a process is the invention in certain embodiments. The process can be any of the above-discussed methods.

An apparatus is the invention in certain embodiments. The apparatus can include at least one memory including computer program code and at least one processor. The at least one memory and the computer program code can be configured to, with the at least one processor, cause the apparatus at least to receive at a cluster head, a multicast/broadcast packet from a base station. The at least one memory and the computer program code can also be configured to, with the at least one processor, cause the apparatus at least to monitor to detect whether any members of a cluster of the cluster head responds to the multicast/broadcast packet with a negative acknowledgment directed to the cluster head. The at least one memory and the computer program code can further be configured to, with the at least one processor, cause the apparatus at least to, when a result of the monitoring is no detection of any negative acknowledgments, and the cluster head successfully received the multicast/broadcast packet, send, by the cluster head, a general acknowledgment of the multicast/broadcast packet to the base station.

Certain further embodiments of the invention are also an apparatus. The apparatus includes at least one memory including computer program code and at least one processor. The at least one memory and the computer program code can be configured to, with the at least one processor, cause the apparatus at least to send, by a base station, a multicast/broadcast packet to a cluster including a cluster head and cluster member(s). The at least one memory and the computer program code can also be configured to, with the at least one processor, cause the apparatus at least to store in a storage buffer the multicast/broadcast packet while awaiting an acknowledgment of the multicast/broadcast packet. The at least one memory and the computer program code can further be configured to, with the at least one processor, cause the apparatus at least to release the storage buffer upon receiving any acknowledgment of the multicast/broadcast packet except a general negative acknowledgment.

Certain additional embodiments of the present invention can include an apparatus. The apparatus can include at least one memory including computer program code and at least one processor. The at least one memory and the computer program code can be configured to, with the at least one processor, cause the apparatus at least to receive, at a cluster member, a multicast/broadcast packet from a base station. The at least one memory and the computer program code can also be configured to, with the at least one processor, cause the apparatus at least to monitor to determine whether another cluster member responds to a cluster head with a negative acknowledgment. The at least one memory and the computer program code can further be configured to, with the at least one processor, cause the apparatus at least to monitor to determine what kind of acknowledgment the cluster head uses to respond to the base station, wherein the kind is one kind selected from a general affirmative acknowledgment, a general negative acknowledgment, a specific affirmative acknowledgment, or a specific negative acknowledgment.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Certain ACK/NACK feedback schemes for eNodeB controlled D2D cluster communications with a cluster head can be configured to save cellular system overhead and reduce retransmission latency. Such schemes can be applied to broadcasting environment with receiving status feedback and cluster head among all the devices in question.

Figure 1:
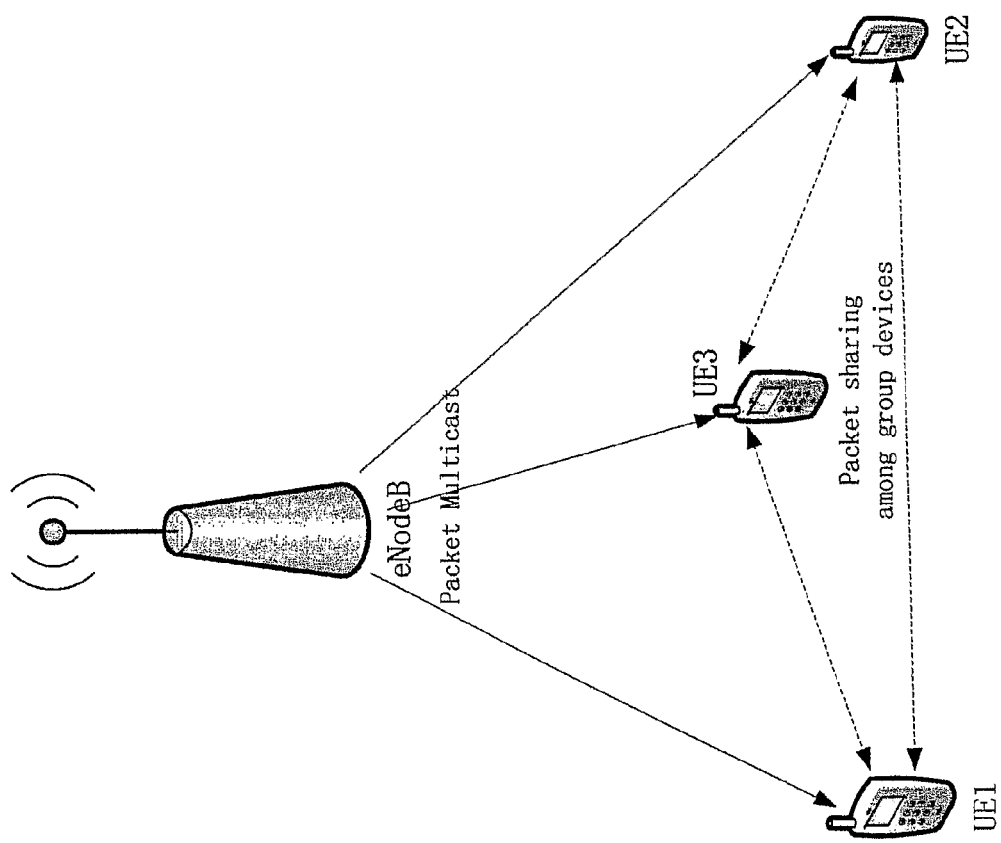
FIG. 1 illustrates a D2D cluster communication scenario.

In eNodeB controlled D2D cluster communications as illustrated in FIG. 1, a cluster of devices receive the same data packet via eNodeB multicasting, some of the devices receive the packet successfully while others fail. In the worst case, none of them receives the packet successfully. In order to guarantee received packets correctly, ACK/NACK, modulation coding scheme (MCS) assignment and channel quality indicator (CQI) of D2D links etc. feedback is conventionally thought to be inevitable. Such feedback implies significant signaling overhead and power consumption for device, consequently leads to cellular system capacity and throughput reduction.

Figure 2:
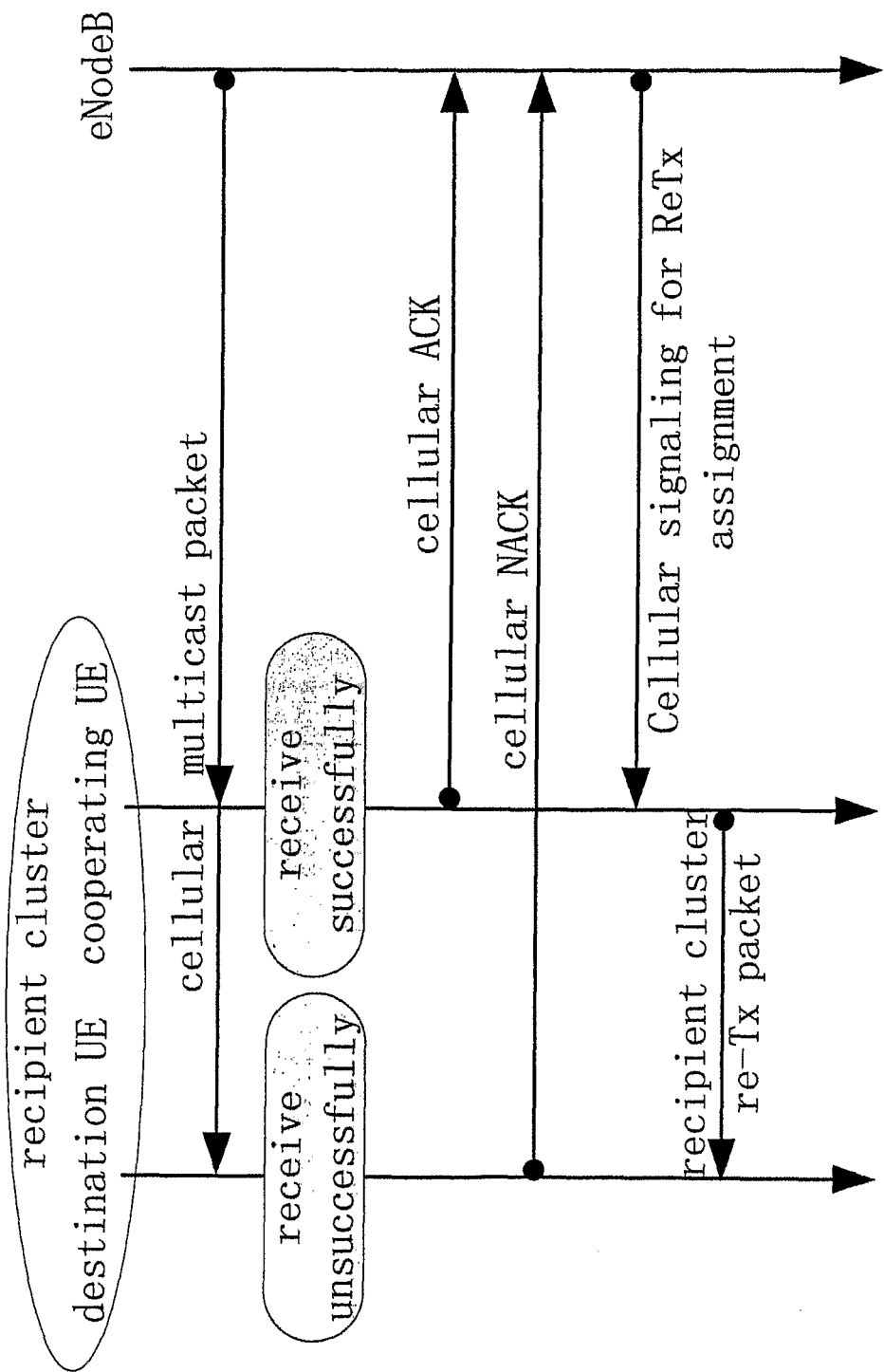
FIG. 2 illustrates straightforward ACK/NACK feedback signaling via a cellular link and re-transmission via a D2D link.

As illustrated in FIG. 2, in a straightforward scheme, eNodeB sends the packets to a cooperating device and a destination device (a recipient cluster). The co-operating device can be the same as the D2D cluster head and the destination device can be the same as the D2D device within the cluster. If the packet as received contains an error and if the link within the cluster is better than cellular link, it may be more efficient to re-transmit among the cluster devices via a recipient cluster link. One example straightforward signaling and retransmission mechanism is as follows: the cooperating device and destination device send an ACK/NACK message to feedback receiving status to eNodeB respectively via a cellular link. Then the cooperating device with the correct packet reception can re-transmit the packet to destination device via the recipient cluster link.

Using this approach, if we assume there are N destination UEs and 1 cooperating UE, N+1 bits HARQ acknowledgement feedback signaling is needed via the cellular uplink.

The another straightforward way for the HARQ feedback signaling is that all the destination UEs send the HARQ acknowledgement to the co-operating UE and co-operating UE forwards all the HARQ acknowledgement feedback to the eNodeB. By that way, N bits HARQ acknowledgement feedback is needed within the cluster and N+1 bits HARQ acknowledgement feedback is needed via the cellular uplink. On the other hand, eNodeB may need to inform which UE is responsible for the retransmission in the cellular downlink.

In view of the discussion above, it can be seen that it is a big challenge to optimize signaling overhead, reduce power consumption as much as possible and still provide reliable information to eNodeB. Certain embodiments of the present invention aim to provide an efficient ACK/NACK feedback scheme for eNodeB controlled D2D cluster communications with cluster head to save cellular signaling overhead and reduce cellular power consumption while guaranteeing system reliability.

More specifically, certain embodiments of the present invention aim to provide an efficient ACK/NACK feedback scheme for eNB multicast/broadcast for eNB controlled D2D cluster communications with cluster head to save cellular signaling overhead, reduce cellular power consumption and guarantee system reliability. Such ends may be accomplished, in certain embodiments by the cluster head categorizing decoding results (ACK/NACK) for the cluster into 4 cases, and sending the cluster's receiving status via cellular link. Additionally, reliance may be placed on the eNodeB and all the cluster devices listening to the cluster head's response.

The four cases may be as shown in the following example:

Case 1 All_NACK: None of the devices in the D2D cluster receives packet successfully. In response to this case, the eNB can retransmit the same packet.

Case 2 All_ACK: All devices in the D2D cluster (include the head itself) receive the packet successfully. In response to this case, the eNB can multicast a new packet.

Case 3 Self_ACK: The D2D cluster head itself receives the packet successfully, and at least one cluster device has a packet error. The D2D cluster head can retransmit the same packet to the cluster member, and the eNB can remove the packet from its storage buffer.

Case 4 Self_NACK: The D2D cluster head itself receives the packet with a packet error, but at least one cluster device receives the correct packet successfully. The D2D cluster device with highest priority order can retransmit the same packet to the cluster head. Optionally, the cluster device can simultaneously retransmit the same packet to one or more of the other cluster devices. Alternatively, once the cluster head has received the packet, the cluster head.

In case 4, there are several ways in which the retransmission of the packet can proceed. For example, the cluster head may specifically request retransmission by a cluster member which successfully received the packet. The request may be for a multicast of the packet to all NACKed members of the cluster including the cluster head, or a simple transmission to the cluster head for subsequent distribution to the cluster members.

Alternatively, a cluster member that successfully received the packet can be automatically selected based on predetermined rules. The predetermined rules can include a pre-ordering for D2D cluster devices, such as discussed below.

For example, all the D2D cluster devices can be pre-ordered based on any kind of decision criteria. One example of the decision criteria can be a MAC address of the D2D cluster device, wherein the pre-order may be in ascending order of MAC address. This would require that each D2D device know the MAC addresses of the other devices in the cluster. The pre-order of the device can be assigned to each device either implicitly or explicitly. All the devices with packet error can send a NACK to the cluster head and the rest of the devices, which received the packet correctly can listen.

By pre-ordering in case 4 where the packet will be retransmitted among the cluster, the cluster devices can decide by themselves who (e.g., the highest-order device with correct packet reception) will be responsible to retransmit the packet within the cluster. The retransmitting cluster device assignment signaling could be avoided by such an arrangement.

Certain embodiments of the present invention can utilize less signaling overhead and have lower power consumption than previous approaches.

An ACK/NACK feedback scheme for eNodeB controlled D2D cluster communications as an example implementation of the approach outlined above is presented below. A general assumption for the example implementation is that the D2D cluster head manages/maintains the devices within the cluster in semi-static manner.

Based on such an assumption, the scheme can include two-bit HARQ acknowledgment feedback via a cellular link. eNodeB while all cluster devices listen. The two-bit feedback can encode four cases, which have been, in this example, organized differently than in the preceding example:

Case 1 All_ACK: All devices in the D2D cluster (including the cluster head itself) receive the packet successfully. In this case, the eNodeB (or other base station element) can multicast a new packet.

Case 2 All_NACK: None of the devices in the D2D cluster (including the cluster head) receives the packet successfully. In this case, the eNodeB can re-transmit the same packet.

Case 3 Self_ACK: The D2D cluster head itself receives the packet successfully, and at least one cluster device (other than the cluster head) receives the packet with a packet error. The D2D cluster head can re-transmit the same packet to the one or more cluster devices that experienced a packet error.

Case 4 Self_NACK: The D2D cluster head itself receives the packet with a packet error, but at least one cluster device receives the packet successfully. The D2D cluster device with the highest priority order can re-transmit the same packet.

The pre-ordering for D2D cluster devices can be based on any kind of decision criteria, as noted above. By pre-ordering in case 4 where the packet is to be re-transmitted among the cluster (not by the cluster head), the cluster devices can decide by themselves who (e.g., the highest-order device with correct packet reception) will be responsible to re-transmit the packet within the cluster. By pre-ordering, the re-transmitting cluster device assignment signaling could be avoided for each retransmission.

Based on the above scenario assumptions and HARQ acknowledgment feedback scheme via D2D and cellular link respectively, the overall procedure of the proposed HARQ acknowledgement feedback for D2D cluster communication can be implemented as set forth below:

All the D2D cluster devices can be pre-ordered. Then, an eNodeB can multicast the data packet to the D2D cluster. Each cluster device and cluster head decodes the received packet. If decoding is successful, the decision is ACK; otherwise, the decision is NACK. If the decision is NACK for a particular cluster device, the cluster device with packet error sends NACK via D2D link. The cluster head and cluster devices with decision ACK, i.e. with a correctly received packet, listen. The cluster head can categorize the overall decoding result of all the devices into one of the four cases above, and can send a message indicative of the overall receiving status representing the cluster via cellular link. The eNodeB and all the cluster devices can listen to the cluster head's message.

Table 1 gives one implementation example of 4 cases represented by two bits.

TABLE 1

ACK/NACK implementation example of 4 cases representing bits

| 4 cases | b(1)b(0) |
|---|---|
| All_ACK | 00 |
| All_NACK | 11 |
| Self_ACK | 01 |
| Self_NACK | 10 |

Figure 3:
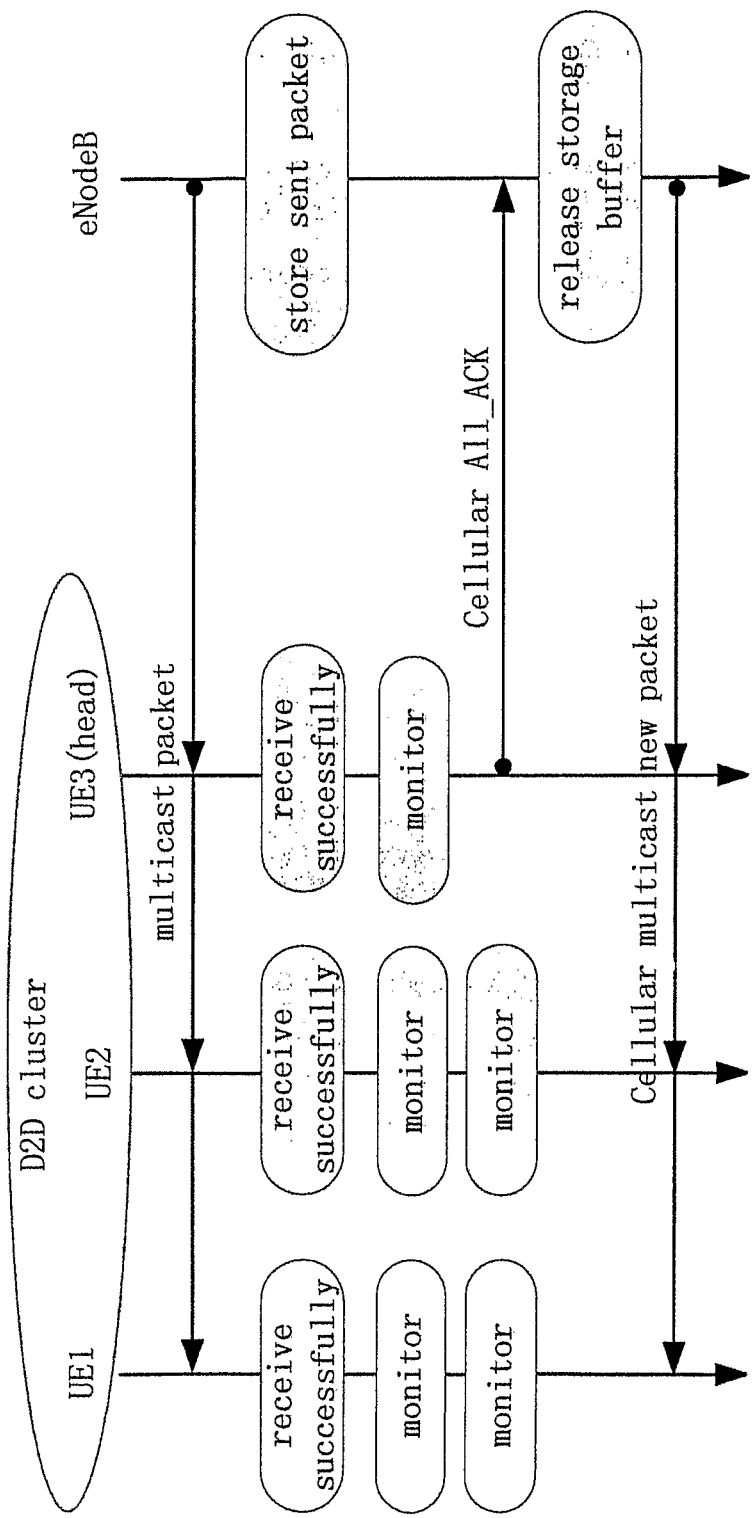
FIG. 3 illustrates a cluster head sending All_ACK signaling.

Case 1 All_ACK. As noted above, in this case, all the devices in the D2D cluster receive the packet successfully, as illustrated in FIG. 3. No cluster device sends NACK to the cluster head, but instead each of the cluster devices listens. As the cluster head does not receive anything from the other cluster devices in a pre-defined time interval, the cluster head sends an All-ACK via a cellular link to the eNodeB. The eNodeB and the cluster devices listen. Then, the eNodeB can release the storage buffer and multicast the new packet. The cluster head and the other D2D devices can receive the new packet via the cellular link.

Figure 4:
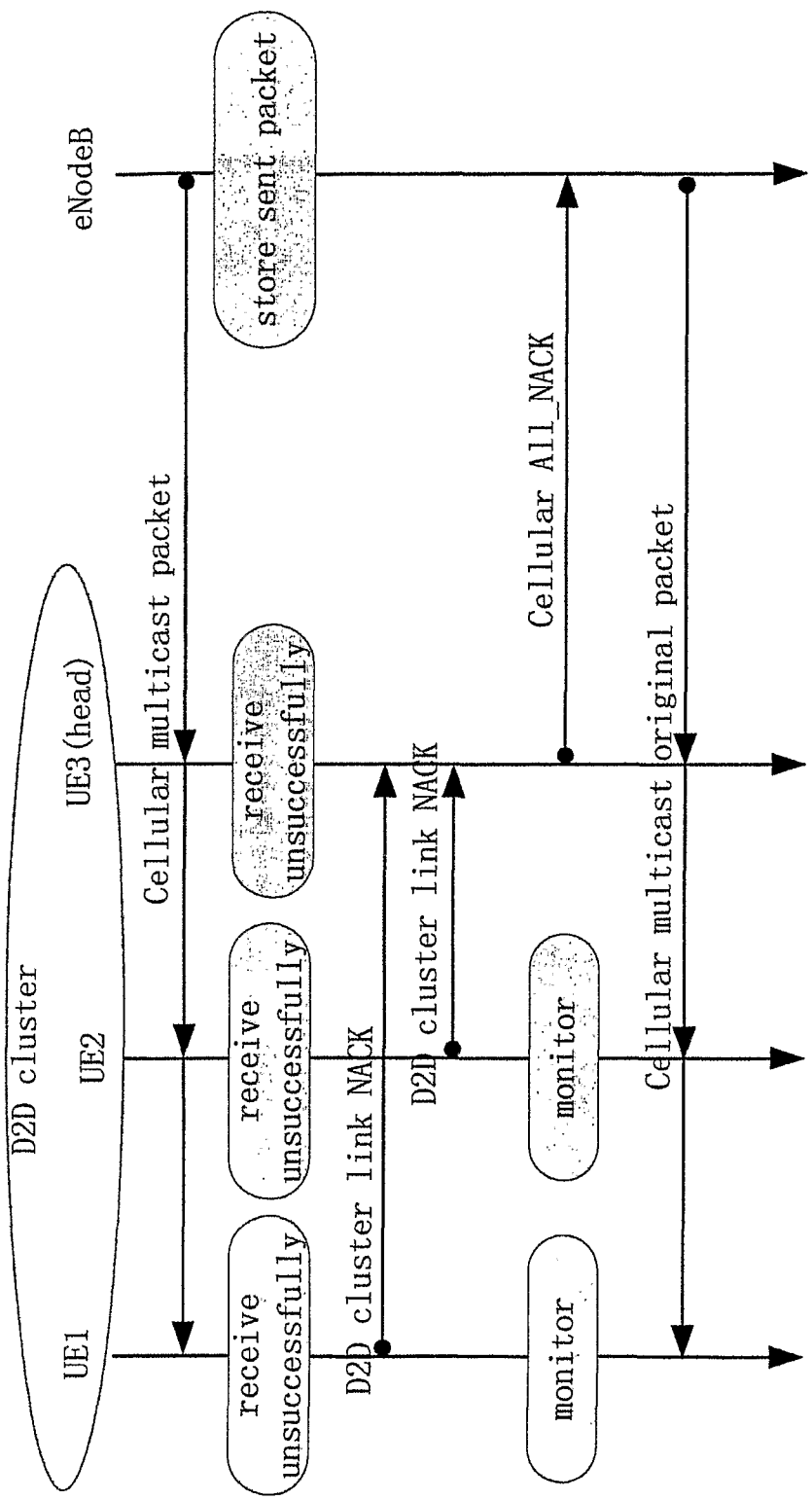
FIG. 4 illustrates a cluster head sending All_NACK signaling.

Case 2 All_NACK. In this case, none of the D2D cluster devices, including the cluster head, receives the packet successfully, as illustrated in FIG. 4. The cluster devices with a packet error send a NACK message to the cluster head and the cluster head listens. The cluster head then sends an All_NACK via a cellular link to the eNodeB. The eNodeB and the cluster devices listen. Of course, it is not particularly necessary for the cluster devices to listen in this case, since none of the cluster devices would be able to retransmit the packet, regardless of whether or not the cluster head received the packet. Then the eNodeB can multicast/re-transmit the same packet. The cluster head and other cluster devices receive the re-transmitted packet via cellular link.

Figure 5:
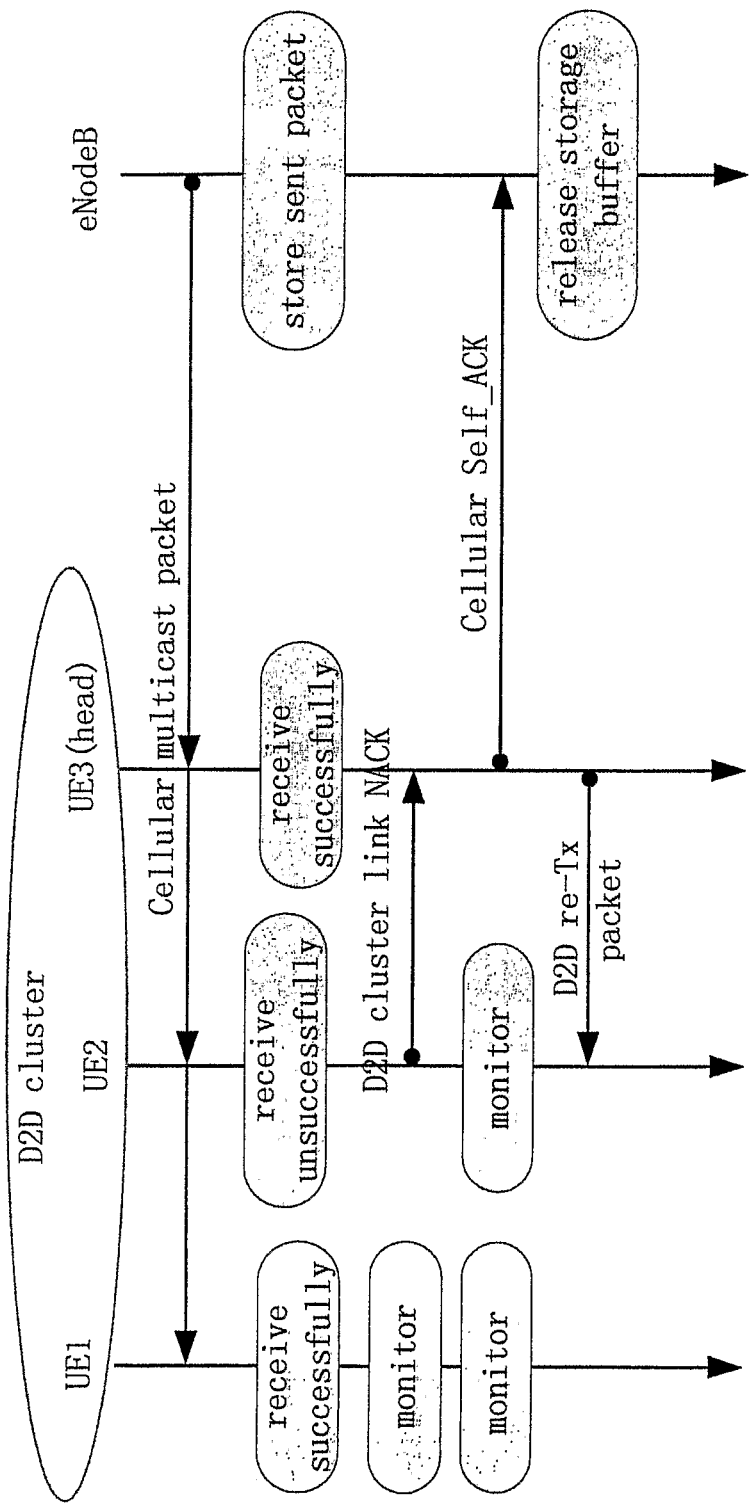
FIG. 5 illustrates a cluster head sending Self_ACK signaling.

Case 3 Self_ACK. In this case, the D2D cluster head receives the packet successfully, but at least one cluster device receives the packet unsuccessfully, as illustrated in FIG. 5. The cluster devices which have received the packet with a packet error send a NACK via the D2D link. Cluster devices that received the packet successfully, as well as the cluster head listen. Then the cluster head sends a Self_ACK via a cellular link. The eNodeB and all the cluster devices listen. In response, the eNodeB releases the storage buffer and permits the cluster devices to handle the retransmission. The cluster head can retransmit the packet and the NACKed devices can listen via the D2D link.

After decoding the retransmitted packet from the cluster head, the NACKed UE can send the receiving status to cluster head as usual. The cluster head can send either a Self_ACK or an All_ACK to the eNB based on the receiving status from the cluster members. This can be repeated until a predetermined maximum number of retransmissions is reached or until All_ACK is achieved. The eNB can decide to send a new packet if ALL_ACK was sent or await retransmission within the cluster if Self_ACK is received.

Figure 6:
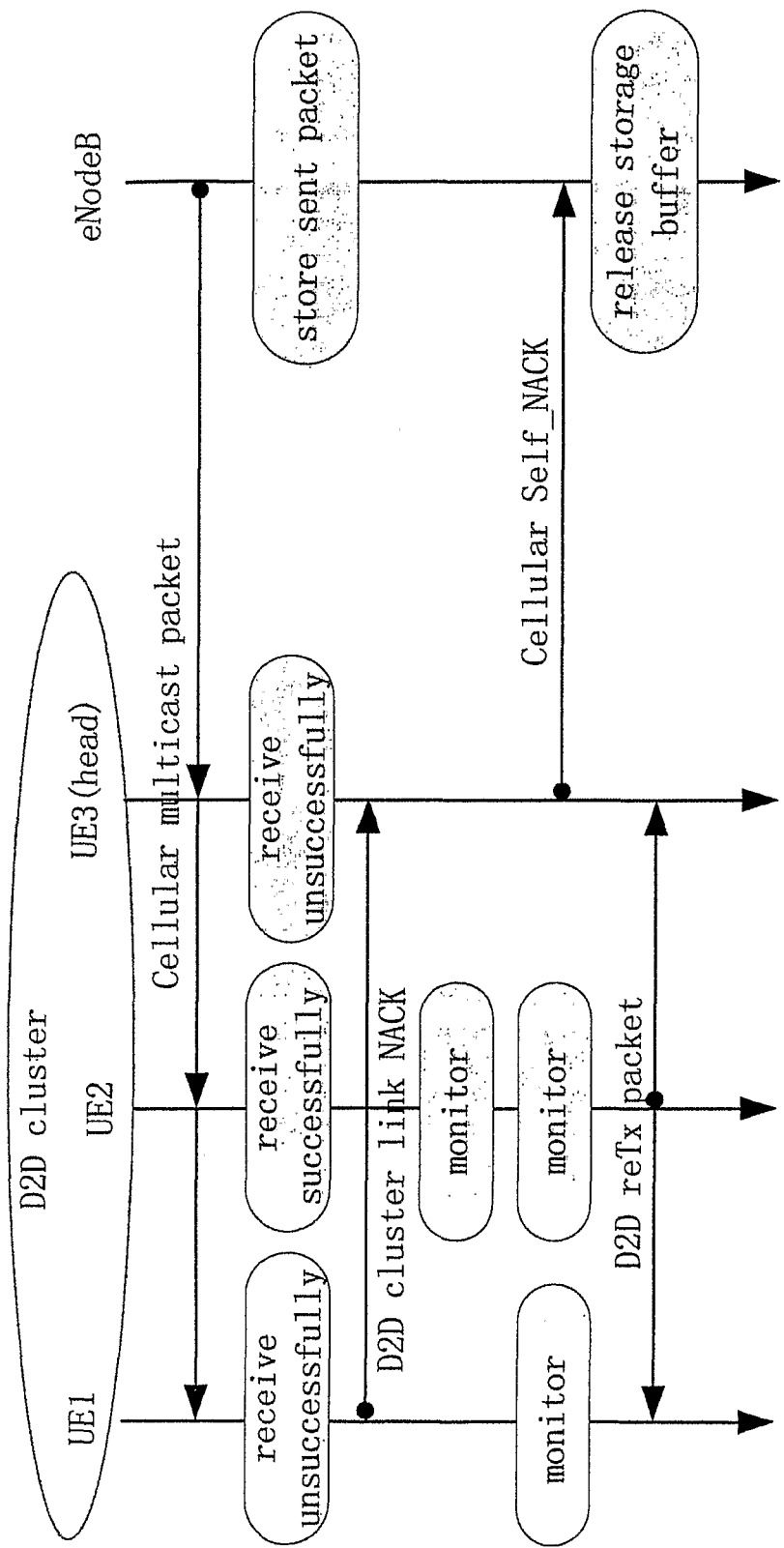
FIG. 6 illustrates a cluster head sending Self_NACK signaling.

Case 4 Self_NACK. In this case, the D2D cluster head does not receive packet successfully, but at least one cluster device receives the packet successfully, as illustrated in FIG. 6. The cluster devices with packet error can send a NACK via the D2D link. Cluster devices with the correct packet, as well as the cluster head, listen. Then, the cluster head can send a Self_NACK via the cellular link. The eNodeB and all the cluster devices can listen. In response, the eNodeB can release the storage buffer and let the cluster devices handle the retransmission. The cluster device with the correct packet and the highest order can retransmit the packet, and the NACKed devices (and cluster devices that have the correct packet but a lower order) can listen via D2D link.

After decoding the retransmitted packet, the NACKed UE can send the receiving status to the cluster head as usual. The cluster head can send either a Self_ACK, All_ACK, or Self_NACK to the eNB based on the receiving status from the cluster members. This process can be repeated until a maximum number of retransmissions is reached or until All_ACK is achieved. The eNB can decide to send a new packet if ALL_ACK is sent or to await retransmission within the cluster if Self_ACK/Self_NACK.

As an example, in Table 2 there are N=5 UEs and 1 cluster head. The "ACK" UEs (UE2, 3, and 5) can be monitoring while the NACKed UEs (UE1 and 4) are sending the NACK to cluster head. By code division multiplexing (CDM) techniques as one of the options, the UE specific NACK can be distinguished at the receiving UE according to the UE specific code sequence information. Therefore, UE2 can deduce by itself that it is to retransmit the packet via the D2D link according to the pre-ordering of the devices.

TABLE 2

Intra-cluster HARQ status

| | pre-ordered cluster devices | | | | |
|---|---|---|---|---|---|
| UE1 | UE2 | UE3 | UE4 | UE5 | Cluster head |
| HARQ feedback NACK | ACK | ACK | NACK | ACK | NACK |

As long as there is a cluster head among the devices in question, the above-described method can be applied to the receiving status feedback broadcasting environment. Thus, a system can be employed that may provide various benefits relative to previous implementations of status feedback in a broadcasting environment.

For example, such a method and system may result in less cellular UL HARQ signaling overhead. Thus, such a method and system may enable a more efficient utilization of the available bandwidth.

As illustrated in Table 3 (below), N+1 can be the number of cluster devices, including a cluster head. A conventional scheme always requires N+1 bits for cellular uplink signaling. In contrast, in certain embodiments of the present invention, the scheme requires only 2 bits to feedback the overall receiving status of the cluster head and all the cluster devices so that the cellular uplink signaling can be reduced significantly, especially as the number of cluster devices gets large.

TABLE 3

Signaling overhead per packet comparison between rival schemes

| Signaling overhead | D2D cluster link | Cellular uplink |
|---|---|---|
| Conventional | 0 or N | N + 1 |
| Novel | N | 2 |

Additionally, certain embodiments of the present invention may reduce power consumption of the devices. Although N-bit HARQ acknowledgment via the D2D link may still be needed, because the D2D link may be relatively better than cellular link, the D2D link may consume much less transmission power and resources. Indeed, lower protection may be needed for D2D signaling. Furthermore, in certain embodiments, only NACKed cluster devices send NACK signals.

Moreover, certain embodiments of the present invention can save eNodeB buffer storage. For example, certain embodiments of the ACK/NACK feedback scheme can enable intra-cluster retransmission whenever one cluster device or the cluster head receives the packet successfully. Thus, the eNodeB can release the storage buffer for the original packet as early as possible.

Furthermore, in certain embodiments of the present invention there is no need to engage in re-transmitting cluster device assignment signaling for each retransmission. By pre-ordering, the re-transmitting cluster device assignment signaling can be avoided for each retransmission.

When all the cluster devices are pre-ordered, based on any kind of decision criteria, a common decision mechanism can be defined in advance. The decision criteria could be connected with the code used for providing the code multiplexed NACK response. In other examples, cluster devices could be ordered based on intra-cluster device identification (ID), or based on order of joining the cluster, etc. While such a mechanism may require planning in advance, it does not necessarily require extra signaling, or, at least, may not necessarily require extra signaling every time the mechanism is employed.

Figure 7:
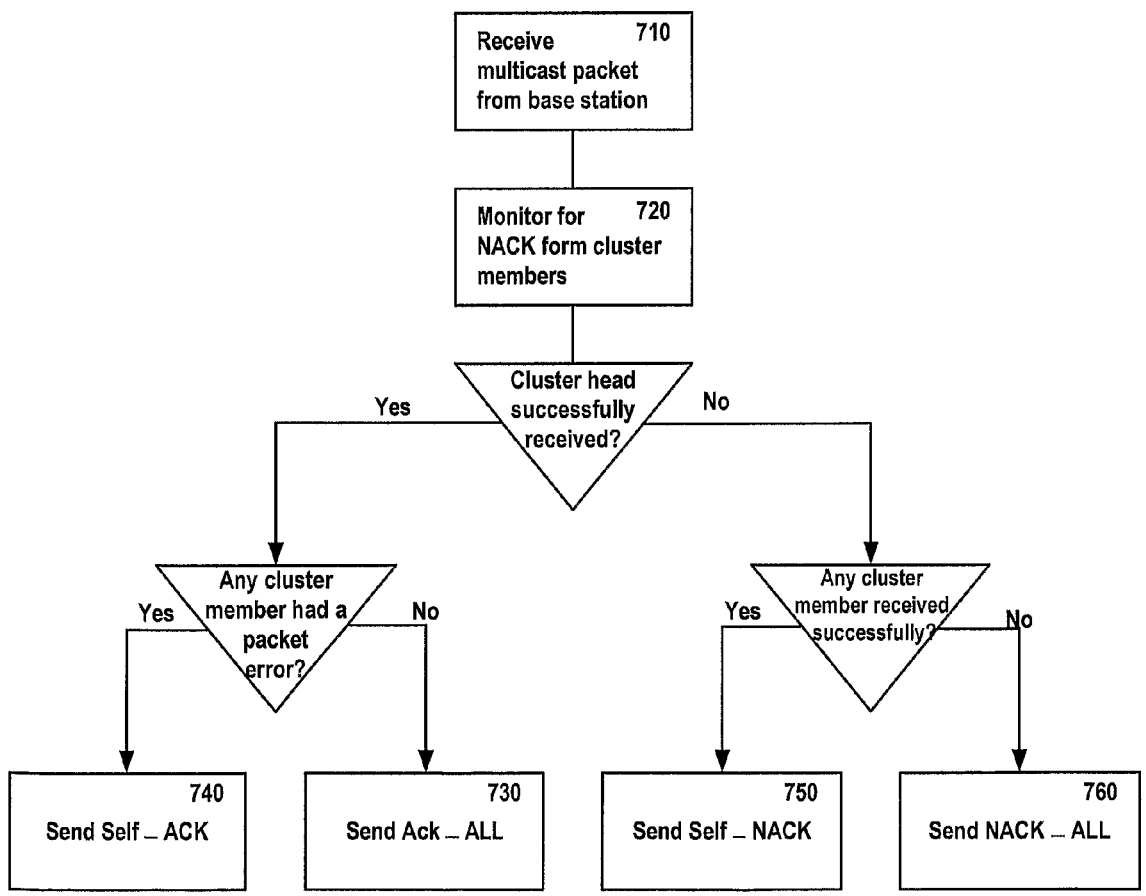
FIG. 7 illustrates a method according to an embodiment of the present invention.

FIG. 7 illustrates a method according to an embodiment of the present invention. As shown in FIG. 7, the method can include receiving 710 at a cluster head, either successfully or unsuccessfully, a multicast/broadcast packet from a base station. The term "receive" here does not require a successful reception, without packet errors, but also includes a reception in which the packet cannot be decoded. The method can also include monitoring 720, at the cluster head, to detect whether any members of a cluster of the cluster head responds to the multicast/broadcast packet with a negative acknowledgment (for example, a NACK) directed to the cluster head. The method of FIG. 7 further includes, when a result of the monitoring is no detection of any negative acknowledgments, and the cluster head successfully received the multicast/broadcast packet, sending 730, by the cluster head, a general acknowledgment of the multicast/broadcast packet to the base station. The general acknowledgment can be an ACK_ALL message.

The method can further include, when the result of the monitoring is detection of at least one negative acknowledgment, and the cluster head successfully received the multicast/broadcast packet, sending 740, by the cluster head, a specific acknowledgment of the multicast/broadcast packet to the base station and re-transmitting the packet to the cluster member(s) that did not receive the packet correctly. The specific acknowledgment can be a Self_ACK message. The method can also include, when the result of the monitoring is detection of at least one of the cluster members that has not provided a negative acknowledgment, and the cluster head has unsuccessfully received the multicast/broadcast packet, sending 750, by the cluster head, a specific negative acknowledgment of, the multicast/broadcast packet to the base station. The specific negative acknowledgment can be a Self_NACK message. The method can additionally include, when the result of the monitoring is detection of all cluster members providing negative acknowledgment, and the cluster head has unsuccessfully received the multicast/broadcast packet, sending 760, by the cluster head, a general negative acknowledgment of the multicast/broadcast packet to the base station. The general negative acknowledgment can be a NACK_all message.

Figure 8:
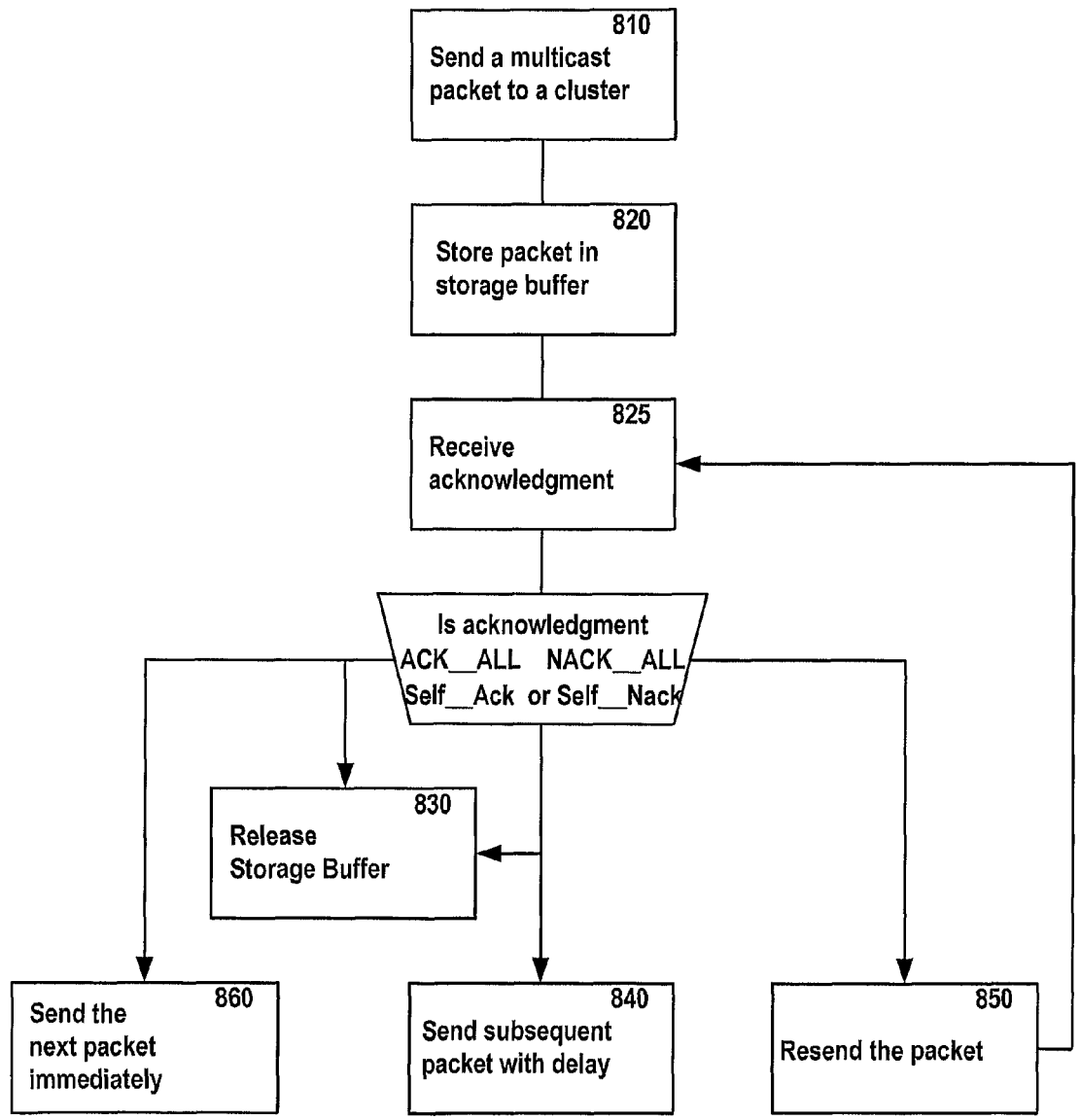
FIG. 8 illustrates a method according to an embodiment of the present invention.

FIG. 8 illustrates a method according to an embodiment of the present invention. As shown in FIG. 8, the method includes sending 810, by a base station, a multicast/broadcast packet to a cluster including a cluster head and cluster member(s). The method also includes storing 820, in a storage buffer at the base station, the multicast/broadcast packet while awaiting an acknowledgment of the multicast/broadcast packet. Upon receiving 825 an acknowledgment, the method further includes releasing 830, by the base station, the storage buffer upon receiving any acknowledgment of the multicast/broadcast packet except a general negative acknowledgment.

The method can additionally include sending 840 a subsequent multicast/broadcast packet with a predetermined delay when the acknowledgment is either a specific negative acknowledgment or a specific affirmative acknowledgment. The method of FIG. 8 can also include re-sending 850 the multicast/broadcast packet upon receiving a general negative acknowledgment. The method can additionally include sending 860 the next packet without delay when the acknowledgment is a general affirmative acknowledgment.

Figure 9:
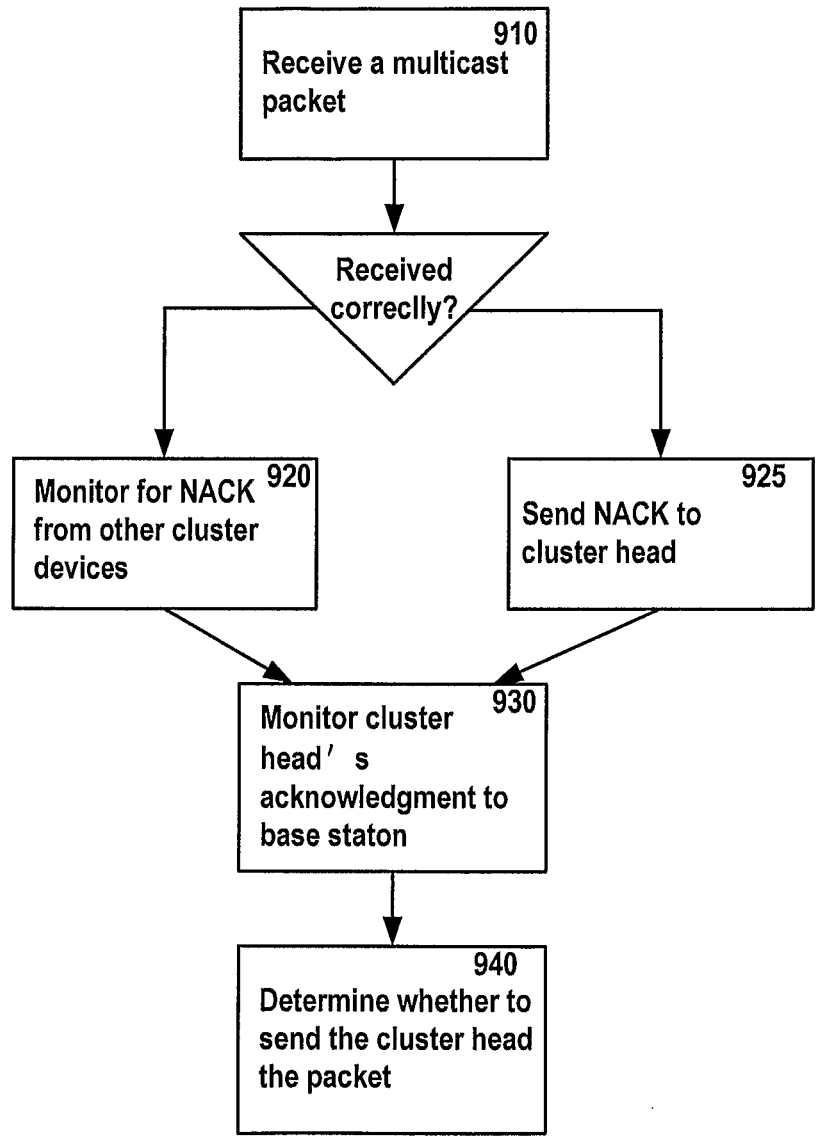
FIG. 9 illustrates a method according to an embodiment of the present invention.

FIG. 9 illustrates a method according to an embodiment of the present invention. The method includes receiving 910, at a cluster member, either successfully or unsuccessfully, a multicast/broadcast packet from a base station. Again, the term "receive" is not limited to successful reception. The method also includes monitoring 920, at the cluster member, to determine whether another cluster member responds to a cluster head with a negative acknowledgment. If the packet was not received correctly, the method can include sending 925 a negative acknowledgment to the cluster head, using a D2D communication link. The method further includes monitoring 930, at the cluster member, to determine what kind of acknowledgment the cluster head uses to respond to the base station, wherein the kind is one kind selected from a general affirmative acknowledgment, a general negative acknowledgment, a specific affirmative acknowledgment, or a specific negative acknowledgment.

The method can further include, when the cluster head did not successfully receive the packet as indicated by a specific negative acknowledgment and the cluster member successfully received the packet, determining 940 whether to send the multicast/broadcast packet to the cluster head and other cluster member(s) based on predetermined rules. The predetermined rules include an order of priority among members of a cluster, and wherein the cluster member determines whether to send the multicast/broadcast packet based on the priority of the cluster member relative to at least one other member of the cluster.

Figure 10:
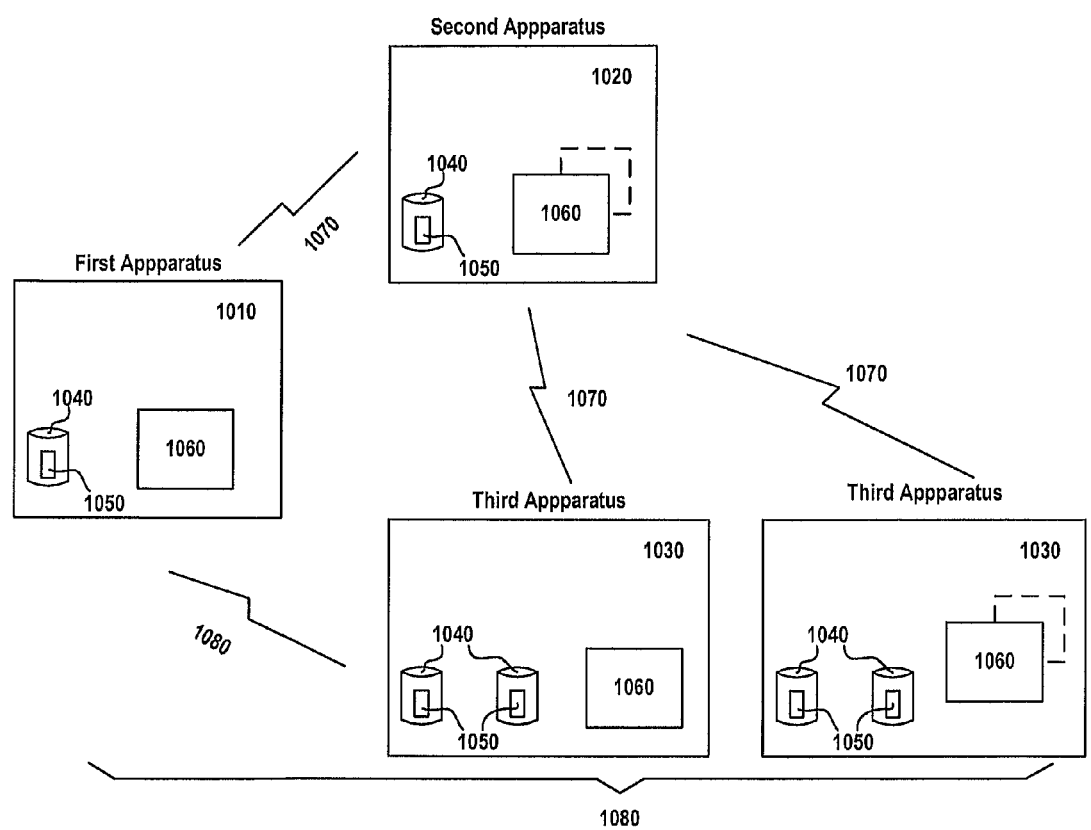
FIG. 10 illustrates a system according to certain embodiments of the present invention.

FIG. 10 illustrates a system according to certain embodiments of the present invention. The system can include a first apparatus 1010, which may be a cluster head. The system can further include a second apparatus 1020, which may be a base station, such as an eNode B. The system can also include one or more third apparatuses 1030 (two shown, but more are possible), which may be cluster member devices.

Each of the first apparatus 1010, second apparatus 1020, and third apparatus 1030 may include at least one memory 1040 including computer program code 1050. Each of the first apparatus 1010, second apparatus 1020, and third apparatus 1030 can also include at least one processor 1060. The at least one memory 1040 and computer program code 1050 can be configured, with the at least one processor 1060, to cause the corresponding apparatus to perform a method, such as on of the methods illustrated The first apparatus 1010 and the third apparatus 1030 can be connected to the second apparatus 1020 via a first wireless link 1070, which may be a cellular link. The first apparatus 1010 and the third apparatus 1030 can be connected to each other via a second wireless link 1080, which may be a D2D link.

One having ordinary skill in the art will readily understand that the invention as discussed above may be practiced with steps in a different order, and/or with hardware elements in configurations which are different than those which disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
    receiving at a cluster head, a multicast/broadcast packet from a base station;
    monitoring, at the cluster head, to detect whether any members of a cluster of the cluster head responds to the multicast/broadcast packet with a negative acknowledgment directed to the cluster head; and
    sending, by the cluster head, a general acknowledgment feedback of the packet to the base station, wherein
    when a result of the monitoring is detection of all cluster members providing negative acknowledgment, and the cluster head has unsuccessfully received the multicast/broadcast packet, sending, by the cluster head, a general negative acknowledgment of the multicast/broadcast packet to the base station.

2. A method, comprising:
    receiving, at a cluster member, a multicast/broadcast packet from a base station;
    monitoring, at the cluster member, to determine whether another cluster member responds to a cluster head with a negative acknowledgment;
    monitoring, at the cluster member, to determine what kind of acknowledgment the cluster head uses to respond to the base station, wherein the kind is one kind selected from a general affirmative acknowledgment, a general negative acknowledgment, a specific affirmative acknowledgment, or a specific negative acknowledgment.

3. The method according to claim 1, further comprising:
    when the cluster head did not successfully receive the packet as indicated by a specific negative acknowledgment and the cluster member successfully received the packet, determining whether to send the multicast/broadcast packet to the cluster head and other cluster member(s) who have not received the packet correctly based on predetermined rules.

4. The method according to claim 1, wherein the predetermined rules include an order of priority among members of a cluster, and wherein the cluster member determines whether to send the multicast/broadcast packet based on the priority of the cluster member relative to at least one other member of the cluster.

5. An apparatus, comprising:
    at least one memory including computer program code; and
    at least one processor, wherein the at least one memory and the computer program code are configured to, with the at least one processor, cause the apparatus at least to receive at a cluster head, a multicast/broadcast packet from a base station;

monitor to detect whether any members of a cluster of the cluster head responds to the multicast/broadcast packet with a negative acknowledgment directed to the cluster head; and send a general acknowledgment feedback of the packet to the base station, wherein the at least one memory and the computer program code are also configured to, with the at least one processor, cause the apparatus at least to, when a result of the monitoring is detection of at least one of the cluster members that has not provided a negative acknowledgment, and the cluster head has unsuccessfully received the multicast/broadcast packet, send, by the cluster head, a specific negative acknowledgment of the multicast/broadcast packet to the base station.

6. An apparatus, comprising:

at least one memory including computer program code; and at least one processor, wherein the at least one memory and the computer program code are configured to, with the at least one processor, cause the apparatus at least to receive, at a cluster member, a multicast/broadcast packet from a base station;

monitor to determine whether another cluster member responds to a cluster head with a negative acknowledgment;

monitor to determine what kind of acknowledgment the cluster head uses to respond to the base station, wherein the kind is one kind selected from a general affirmative acknowledgment, a general negative acknowledgment, a specific affirmative acknowledgment, or a specific negative acknowledgment.

7. The apparatus according to claim 6, wherein the at least one memory and the computer program code are also configured to, with the at least one processor, cause the apparatus at least to, when the cluster head did not successfully receive the packet as indicated by a specific negative acknowledgment and the cluster member successfully received the packet, determine whether to send the multicast/broadcast packet to the cluster head and other cluster member(s) based on predetermined rules.

8. The apparatus according to claim 6, wherein the predetermined rules include an order of priority among members of a cluster, and wherein the cluster member determines whether to send the multicast/broadcast packet based on the priority of the cluster member relative to at least one other member of the cluster.

* * * * *